United States Patent
Bell

(10) Patent No.: US 7,749,560 B2
(45) Date of Patent: Jul. 6, 2010

(54) METHOD OF USING SODIUM SILICATE TO SEAL CRACKS IN COOLING SYSTEMS

(75) Inventor: David R. Bell, Spring, TX (US)

(73) Assignee: Blue Magic, Inc., Conroe, TX (US)

( * ) Notice: Subject to any disclaimer, the term of this patent is extended or adjusted under 35 U.S.C. 154(b) by 929 days.

(21) Appl. No.: 11/584,768

(22) Filed: Oct. 20, 2006

(65) Prior Publication Data

US 2008/0092774 A1    Apr. 24, 2008

(51) Int. Cl.
    *C09K 3/12*    (2006.01)
(52) U.S. Cl. ...................................... 427/140
(58) Field of Classification Search .................. 427/140
    See application file for complete search history.

(56) References Cited

U.S. PATENT DOCUMENTS

| | | |
|---|---|---|
| 2,885,296 A | 5/1959 | Weldon |
| 4,348,235 A | 9/1982 | Lasswell et al. |
| 4,662,940 A | 5/1987 | Monier |
| 4,708,195 A | 11/1987 | Barks |
| 4,765,630 A | 8/1988 | Barks |
| 5,078,866 A | 1/1992 | Filowitz et al. |
| 6,159,276 A | 12/2000 | Barks |
| 6,324,757 B1 * | 12/2001 | Barks ..................... 29/888.011 |
| 6,786,960 B2 | 9/2004 | Profetto |
| 2002/0073540 A1 | 6/2002 | Hipple et al. |

FOREIGN PATENT DOCUMENTS

| | | | |
|---|---|---|---|
| JP | 64-79286 | * | 3/1989 |
| WO | 0040665 A1 | | 7/2000 |
| WO | 2006088335 A1 | | 8/2006 |
| WO | 2007081831 A2 | | 7/2007 |

OTHER PUBLICATIONS

"Bar's Leaks"; http://www.barsproducts.com; 11 pgs., 2006.
"AlumaSeal Radiator Stop Leak"; http://www.goldeagle.com/alumaseal/index.htm; 1 pg., 2006.
"Seal-Up"; http://people.consolidated.net/cargochemical/prod_sealup.html; 1pg., 2005.

* cited by examiner

*Primary Examiner*—Frederick J Parker
*Assistant Examiner*—Nathan T Leong
(74) *Attorney, Agent, or Firm*—Locke Lord Bissell & Liddell LLP

(57) ABSTRACT

A crack in a cooling system may be sealed by the direct addition of dry or powder sodium silicate or a glycol based slurry of sodium silicate. The sodium silicate may be used in conjunction with an inert bulking agent, such as a cellulosic material. The sealant composition may further contain a metal which is non-reactive with sodium silicate. The method has particular applicability in the treatment of cracks in the cooling systems of internal combustion engines.

23 Claims, No Drawings ific acid) to be restricted through the hole or crack. The restricted flow provides additional time for sodium silicate to form a seal over the crack.

METHOD OF USING SODIUM SILICATE TO SEAL CRACKS IN COOLING SYSTEMS

FIELD OF THE INVENTION

This invention pertains to a method of sealing a leak in a cooling system by introducing into the cooling system a sealant comprising solid sodium silicate or a slurry of sodium silicate in a non-aqueous solvent.

BACKGROUND OF THE INVENTION

Commercial products containing a dilute aqueous solution of sodium silicate and flocculated copper metal have been successful in the automotive industry in the sealing of cracks in internal combustion engine cooling systems, including engine blocks, radiators, head gaskets, heads, heater cores, hose connections, and freeze plugs. After introduction of the product into the cooling system, the aqueous solution containing the sodium silicate seeps through the crack as the flocculated copper bridges the crack at its narrowest point. Flow of the aqueous solution through the crack is thereby decreased. Atmospheric oxygen, coupled with the heat transferred through the suspended copper, causes solidification of the sodium silicate in the crack to a hard crystalline material resembling glass; hence, the aqueous solution is often referred to as "liquid glass."

Such commercial products were developed when automotive coolants were alcohol based and gained immense popularity since they were highly compatible with such alcohol based coolants. Today, however, most coolant systems are glycol based, principally mixtures of ethylene glycol and/or propylene glycol and water. Unfortunately, when an aqueous solution of sodium silicate, containing sufficient sodium silicate to function effectively as a sealant, is poured into a cooling system comprised of significant concentrations of ethylene and/or propylene glycol, the sodium silicate frequently forms an insoluble precipitate. Such precipitates typically plug small orifices in cooling systems, thereby resulting in restricted coolant flow and engine overheating.

In order to address the problems caused by the incompatibility of such commercial products with glycol-based coolants, suppliers typically advise consumers to first flush the cooling system with water in order to remove ethylene glycol (and/or propylene glycol) prior to addition of the aqueous sodium silicate solution to the cooling system. Such flushing presents a major inconvenience to consumers and presents a serious drawback to the desirability of use of the product.

Methods of sealing cracks in cooling systems employing sodium silicate are desired which will render moot the requirement of flushing the cooling system with water prior to the addition of the sodium silicate.

SUMMARY OF THE INVENTION

A crack in a cooling system may be sealed by the direct addition of a sealant of dry or powder sodium silicate without a liquid carrier. Alternatively, the sodium silicate may be introduced in a non-aqueous slurry. When introduced, the sodium silicate remains as non-agglomerated undissolved particulates as the particulates are dispersed by circulation through the cooling system.

The method has particular applicability in the treatment of cracks in the cooling systems of internal combustion engines. As the sodium silicate migrates to the crack, heat (from the normal operating conditions of the cooling system), in combination with air, causes the sodium silicate to form a permanent seal over the crack.

In addition to sodium silicate, the sealant may also contain an inert bulking agent, such as a solid cellulosic material.

Further, the sealant may further contain a metal which is non-reactive with sodium silicate.

The sealant is compatible with glycol based antifreeze formulations and may be used without first draining the antifreeze system from the engine. Further, the sealant will not clog restricted passages in the cooling system Upon its introduction into the cooling system, the sealant is circulated with the system coolant, typically a mixture of water and ethylene or propylene glycol. When the coolant mixture seeps through a crack, the sodium silicate particulates and/or optional inert bulking agent serve to bridge the crack at the narrowest point, slowing the flow through the crack. The oxygen in the air on the outside of the hole or crack and the transferred heat causes the sodium silicate in the bridge to solidify or cure.

DETAILED DESCRIPTION OF THE PREFERRED EMBODIMENTS

A crack in a cooling system can be readily sealed by the direct addition into the cooling system of a sealant of solid sodium silicate. (As used herein, the term "crack" shall refer to an open crevice or hole within a cooling system which allows coolant to seep out of the closed circulation of the cooling system to open air spaces outside the cooling system.) As the sodium silicate migrates to the crack, heat (from the normal operating conditions of the cooling system), in combination with oxygen (from the outside air), causes the sodium silicate to form a permanent seal over the crack.

The invention has particular applicability in the sealing of cracks in a cooling system of a combustion engine. The invention may further be used to seal cracks in an industrial cooling system as well as a residential cooling system or in any other cooling system which is vulnerable to the formation of cracks. The invention has particular applicability where the cooling system is based on a glycol, such as ethylene glycol and/or propylene glycol.

In a particularly preferred embodiment, the invention relates to the sealing of one or more cracks in a vehicular combustion engine. Such cracks more commonly form in the radiator, engine block, cylinder head or head gasket.

It is sometimes desirable for the sealant to include, in addition to sodium silicate, an inert bulking agent. The inert bulking agent in the sealant may serve to restrict temporarily the flow of the cooling system mixture through the hole or crack. The bulking agent is typically a solid cellulosic material, typically present in the sealant in an amount ranging from about 2 to about 5 weight percent.

Examples of cellulosic materials include sawdust, wood particles, wood flour, wood fibers, wood chips, ground wood, wood flakes, wood veneers, wood laminates, paper, paper bags, cardboard, newspapers, alfalfa, wheat pulp, cardboard, straw, cotton, rice hulls, coconut shells, peanut shells, bagasse, plant fibers, bamboo fibers, palm fibers, flax fibers, hemp fibers, esparto fibers, kenaf fibers, jute fibers and sisal fibers and other suitable lignocellulosic materials. Mixtures of two or more types of cellulosic materials may be employed. Waste cellulosic material as well as industrial cellulosic materials may be used.

When present, the cellulosic material is preferably crushed and/or shredded into a particle size of from about 20 to about 100 mesh for particulate material or from about 2 to about 20 mm for fibrous material.

The cellulosic material forms a temporary block in the crack, thereby causing the flow of coolant (with sodium silicate) to slow over the crack. It is especially desirable to employ the cellulosic material when the crack being sealed is a large cross-sectional area, such as a hole in excess of 0.25 mm in diameter or a crack in excess of 0.25 mm in width.

The sealant may further contain a metal. The resulting metal-containing sealant may further contain the inert bulking agent. Any metal which is non-reactive with sodium silicate may be used. When present, the metal is typically either copper or stainless steel, typically in an amount up to about 4 weight percent of the sealant composition. The metal may aid in the transmission of heat during sealing, thereby causing the sodium silicate to cure faster.

Other additives may further be used in the sealant, such as binders, antioxidants, etc.

Normally, the amount of sodium silicate in the sealant is at least 95 percent by weight, typically at least 98 percent by weight. In one embodiment, the sealant is composed of 100 percent by weight of sodium silicate.

Components, such as cellulosic materials and metals, may be added to the sodium silicate by simply mixing of the components at room temperature. If desired, the sealant may be in a powder state or conformed into any desired shape, including tablets or pellets of a size sufficient for being introduced into the cooling system. Such solid shaped particulates may be desired since they are more capable of resisting crumbling during shipment and handling and yet are capable of being readily dispersed in the coolant of the cooling system. When used as a shaped particulate, the particulates are typically around a 25 mm diameter. When used as a powder, the sodium silicate should be capable of passing through a 30 mesh screen, but not be passed by about a 180 mesh screen, so that the finest particles are generally excluded. Such a particle distribution is optimal for avoidance of plugging the radiator or heater core, while being suitable to plug pinhole and other small leaks.

The sealant may be introduced into the heating or cooling system in the form of a slurry. Such slurries may further contain one or more of the inert bulking agents, metal or other additives referenced herein. The carrier liquid of the slurry should be miscible with water but not contain water. In a preferred embodiment, the carrier liquid is an alcohol or a glycol. Most preferred is isopropyl alcohol, ethylene glycol and propylene glycol. The amount of sodium silicate in the slurry is typically present between from about 30 to about 40 weight percent.

In a preferred embodiment, the sodium silicate (optionally in combination with an inert bulking agent, metal and/or other additives) is combined with ethylene glycol and/or propylene glycol in an amount sufficient to create a slurry. Since none of the components are soluble in glycol, they remain in the slurry in an undissolved, non-agglomerated state.

The sealant is capable of sealing tiny pinholes and narrow cracks up to about 0.8 mm in diameter (hole) or width (crack). The resulting permanent seal cannot be dislodged by the flow of liquid fluid in the system, and can withstand fluid pressures as high as 40 psi.

The sealant may be introduced into a cooling system of water, glycol (typically ethylene glycol and/or propylene glycol) or a combination of glycol and water. If the cooling system is glycol-based and contains no water, the sodium silicate particulate(s) will continue to circulate in non-agglomerated form until one or more of the particulates becomes lodged in a hole or across a crack, the diameter or size of which is smaller than the diameter or size of the particulate(s) and effects a seal by physically covering the opening. If the cooling system consists essentially entirely of water, the sodium silicate particulates will dissolve and the solidify in the hole or crack to effect a seal.

If the cooling system consists of a mixture of water and ethylene and/or propylene glycol, the sodium silicate particles will slowly begin to dissolve but also will continue to circulate with the optional inert bulking agent (when contained) in non-agglomerated form until one or more of the sodium silicate particulate(s) becomes lodged in a hole or across a crack which is smaller in diameter or size than the particle. The heat from within the cooling system and atmospheric oxygen acting on the water on the outside surface of the particle will cause solidification of the sodium silicate, thereby plugging the targeted hole or crack and eliminating the leak.

The sealant, introduced into the cooling system as the engine is running, is quickly dispersed in the liquid coolant in about fifteen to thirty seconds. When introduced at low concentrations, no incompatibility issues are present between the sodium silicate and any water present within the cooling system. The amount of added sodium silicate is typically dependent on the volumetric size of the cooling system to which it is being introduced. Typically, in an automotive combustion engine having a 16 quart coolant capacity, the weight amount of sodium silicate being introduced into the cooling system is between from about 3 to about 8 ounces (from about 85 to about 225 grams).

The sealant, when present as a slurry, may be packaged in a bottle or tube. When used in its non-slurried state, the sealant may be packaged as a loose powder or in a conformed packaged shape which may be easily stored and handled. When opened, the contents of the sealant may simply be dropped into the coolant of the targeted internal cooling system.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow. All parts are given in terms of weight units except as may otherwise be indicated.

EXAMPLES

The following sealant compositions were prepared:

(A) 128 g of sodium silicate and 3 g of a cellulose bulking material;

(B) 128 g of sodium silicate and 3 g of a cellulose bulking material, slurried in 8 fluid ounces of ethylene glycol.

A coolant mixture of equal parts of ethylene glycol and water was heated and circulated using a centrifugal pump through a 12 inch square block having a 4 inch square opening having a thin (0.001 inch brass plate) and having a hole of about 0.035 inches in diameter. Circulation was stopped, and the sealant composition was added to the mixture. Circulation was resumed, and a permanent glass bead representing a seal formed within and across the hole in about two minutes for both Sealant A and Sealant B.

From the foregoing, it will be observed that numerous variations and modifications may be effected without departing from the true spirit and scope of the novel concepts of the invention.

What is claimed is:

1. A method of sealing a crack in a cooling system comprising introducing into the cooling system a sealant composition comprising dry sodium silicate or a slurry of sodium silicate in an non-aqueous solvent and subjecting the cooling system to heat for a time sufficient in order to form a permanent seal over the crack upon exposure of sodium silicate to air.

2. The method of claim 1, wherein a slurry of sodium silicate in a glycol is introduced into the cooling system.

3. The method of claim 1, wherein the sealant composition comprises a slurry in ethylene glycol and/or propylene glycol of dry sodium silicate.

4. The method of claim 1, wherein the cooling system is an industrial cooling system, a residential cooling system or a cooling system of an internal combustion engine.

5. The method of claim 4, wherein the cooling system is a cooling system of a vehicular combustion engine.

6. The method of claim 5, wherein the crack is present in a radiator, engine block, cylinder head or head gasket.

7. The method of claim 1, wherein the sealant composition further comprises an inert bulking agent.

8. The method of claim 7, wherein the bulking agent comprises a solid cellulosic material.

9. The method of claim 1, wherein the sealant composition further comprises a metal which is non-reactive with sodium silicate.

10. The method of claim 9, wherein the metal is copper or stainless steel.

11. The method of claim 1, wherein the sealant composition comprises at least 95 percent by weight of sodium silicate.

12. The method of claim 1, wherein the coolant of the cooling system comprises water, ethylene glycol and/or propylene glycol and mixtures thereof.

13. A method of sealing a leak in a cooling system comprising ethylene glycol and/or propylene glycol and water, the method comprising directly introducing into the cooling system a sealant composition comprising solid sodium silicate.

14. The method of claim 13, wherein the sealant composition further comprises a solid cellulosic material.

15. The method of claim 13, wherein the sealant composition further comprises a metal which is non-reactive with sodium silicate.

16. The method of claim 15, wherein the metal is copper or stainless steel.

17. The method of claim 13, wherein the sealant composition comprises at least 95 percent by weight of sodium silicate.

18. The method of claim 13, wherein the sealant composition comprises a slurry of sodium silicate in ethylene glycol and/or propylene glycol.

19. A method of sealing a crack in a vehicular combustion engine comprising:
   (a) introducing into the cooling system of the vehicular combustion engine a sealant composition comprising dry sodium silicate or a glycol slurry of sodium silicate; and
   (b) exposing the cooling system to heat for a time sufficient for the crack to be permanently sealed upon exposure of sodium silicate to air
   wherein the amount of sodium silicate introduced to the cooling system is between from about 3 to about 8 ounces.

20. The method of claim 19, wherein the cooling system comprises ethylene glycol and/or propylene glycol and water.

21. The method of claim 19, wherein the crack is present in a radiator, engine block, cylinder head or head gasket.

22. The method of claim 19, wherein the sealant composition further comprises a solid cellulosic material.

23. The method of claim 19, wherein the sealant composition further comprises a metal which is non-reactive with sodium silicate.

* * * * *